United States Patent
Feng et al.

(10) Patent No.: US 10,541,914 B2
(45) Date of Patent: Jan. 21, 2020

(54) DATA PACKET FORWARDING METHOD AND NETWORK DEVICE

(71) Applicant: Huawei Technologies Co., Ltd., Shenzhen (CN)

(72) Inventors: Qiang Feng, Hangzhou (CN); Jianyao Liang, Hangzhou (CN); Huibin Luo, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 15/812,642

(22) Filed: Nov. 14, 2017

(65) Prior Publication Data

US 2018/0069789 A1   Mar. 8, 2018

Related U.S. Application Data

(63) Continuation of application No. PCT/CN2015/079071, filed on May 15, 2015.

(51) Int. Cl.
*H04L 12/801* (2013.01)
*H04L 12/721* (2013.01)
(Continued)

(52) U.S. Cl.
CPC .............. *H04L 45/66* (2013.01); *H04L 45/22* (2013.01); *H04L 45/50* (2013.01);
(Continued)

(58) Field of Classification Search
CPC .................................................... H04L 47/10
See application file for complete search history.

(56) References Cited

U.S. PATENT DOCUMENTS

2007/0053296 A1\* 3/2007 Yazaki ................. H04L 47/10
370/235
2013/0058225 A1 3/2013 Casado et al.
(Continued)

FOREIGN PATENT DOCUMENTS

CN  101616159 A  12/2009
CN  102685006 A  9/2012
(Continued)

OTHER PUBLICATIONS

OpenFlow Switch Specification, Version 1.2 (Wire Protocol 0x03), Dec. 5, 2011, 85 pages.
(Continued)

*Primary Examiner* — Ayanah S George
(74) *Attorney, Agent, or Firm* — Conley Rose, P.C.

(57) ABSTRACT

A data packet forwarding method and a network device, where the method includes, receiving a data packet, obtaining a local physical address and a destination physical address of the data packet when the entry matching the data packet does not exist in the first match table, determining whether the local physical address is the same as the destination physical address, searching a second match table for an entry in which a physical address matches the destination physical address when the local physical address is different from the destination physical address, generating a layer 2 forwarding entry according to the entry matching the destination physical address, and forwarding the data packet according to the layer 2 forwarding entry. Therefore, processing efficiency of the new data packet and network performance are improved.

20 Claims, 12 Drawing Sheets

(51) Int. Cl.
*H04L 12/707* (2013.01)
*H04L 12/723* (2013.01)
*H04L 12/46* (2006.01)
*H04L 12/733* (2013.01)
*H04L 12/741* (2013.01)
*H04L 29/12* (2006.01)

(52) U.S. Cl.
CPC .......... *H04L 12/4641* (2013.01); *H04L 45/20* (2013.01); *H04L 45/54* (2013.01); *H04L 61/2514* (2013.01)

(56) References Cited

U.S. PATENT DOCUMENTS

| | | | |
|---|---|---|---|
| 2013/0151685 A1* | 6/2013 | Bursell | H04L 45/66 709/223 |
| 2014/0341131 A1 | 11/2014 | Jeon et al. | |
| 2015/0010000 A1 | 1/2015 | Zhang et al. | |
| 2015/0039734 A1* | 2/2015 | King | H04L 41/0816 709/221 |
| 2015/0350156 A1 | 12/2015 | Ma et al. | |
| 2016/0218957 A1 | 7/2016 | Liang et al. | |
| 2016/0241459 A1 | 8/2016 | Zheng et al. | |

FOREIGN PATENT DOCUMENTS

| | | |
|---|---|---|
| CN | 103067534 A | 4/2013 |
| CN | 103209121 A | 7/2013 |
| CN | 103401783 A | 11/2013 |
| CN | 104426815 A | 3/2015 |
| CN | 104579968 A | 4/2015 |
| EP | 2975807 B1 | 1/2016 |
| WO | 2014063605 A1 | 5/2014 |
| WO | 2015021881 A1 | 2/2015 |

OTHER PUBLICATIONS

OpenFlow Switch Specification, Version 1.3.1 (Wire Protocol 0x04), Sep. 6, 2012, 128 pages.
OpenFlow Switch Specification, Version 1.5.1 ( Protocol version 0x06 ), Mar. 26, 2015, 283 pages.
Machine Translation and Abstract of Chinese Publication No. CN102685006, Sep. 19, 2012, 19 pages.
Foreign Communication From a Counterpart Application, PCT Application No. PCT/CN2015/079071, English Translation of International Search Report dated Feb. 15, 2016, 2 pages.
Foreign Communication From a Counterpart Application, PCT Application No. PCT/CN2015/079071, English Translation of Written Opinion dated Feb. 15, 2016, 5 pages.
Huawei Tech Co Ltd, "CloudEngine Series Switches VXLAN Technical White Paper," XP055466658, Sep. 20, 2014, 48 pages.
Katta, N., et al., "Infinite CacheFlow in Software-Defined Networks," XP058053579, Hot Topics in Software Defined Networking, Aug. 22, 2014, 6 pages.
Foreign Communication From a Counterpart Application, European Application No. 15892113.0, Extended European Search Report dated Apr. 20, 2018, 10 pages.
Machine Translation and Abstract of Chinese Publication No. CN101616159, Dec. 30, 2009, 14 pages.
Machine Translation and Abstract of Chinese Publication No. CN103401783, Nov. 20, 2013, 12 pages.
Foreign Communication From a Counterpart Application, Chinese Application No. 201580001163.4, Chinese Office Action dated May 30, 2019, 6 pages.

\* cited by examiner

DATA PACKET FORWARDING METHOD AND NETWORK DEVICE

CROSS-REFERENCE TO RELATED APPLICATIONS

This application is a continuation of International Patent Application No. PCT/CN2015/079071 filed on May 15, 2015, which is hereby incorporated by reference in its entirety.

TECHNICAL FIELD

The present disclosure relates to the field of communications technologies, and in particular, to a data packet forwarding method and a network device.

BACKGROUND

OPENFLOW refers to converting a data packet forwarding process originally controlled by a switch/router to a data packet forwarding process completed by both an OPEN-FLOW switch (OFS) and an OPENFLOW control server (OFC) in order to separate data forwarding from routing control.

The OFS maintains a flow table, and performs forwarding only according to the flow table. Generation, maintenance, and delivery of the flow table are implemented by the OFC. The OFS may receive a flow rule delivered by the OFC, and save the flow rule in the flow table. The flow table may be multiple flow tables, each flow table includes multiple entries, and each entry is a flow rule. As shown in FIG. 1, the entry may include a match field (designated as Match Fields and include input port (In Port), virtual local area network (VLAN), source Internet Protocol (IP) address (Src IP), destination IP address (Dst IP), source media access control (MAC) address (Src MAC), destination MAC address (Dst MAC), and so on), a counter (designated as Counters), and an instruction set (designated as Actions). The match field is used to match a received data packet, the counter records statistics information indicating that the entry matches a data packet, and the instruction set determines how to forward a data packet.

Currently, in a Software Defined Network (SDN) mode, for ease of management, a hardware learning function and a flow table management function of an OFS are disabled. When the OFS cannot find a corresponding forwarding rule for a received data packet, the OFS forwards the data packet to an OFC. The OFC determines a forwarding action of the packet, and delivers a new forwarding rule to the OFS. Then, the OFS forwards the data packet according to the forwarding rule.

Disadvantages include that when an OFC performs determining on a new data packet (that is, a data packet whose corresponding forwarding rule cannot be found by querying a flow table) received by an OFS, and consequently, processing efficiency of the new data packet is reduced. In addition, if a link between the OFS and the OFC is interrupted, the OFS cannot process the received new data packet, and consequently, network performance is reduced.

SUMMARY

The present disclosure provides a data packet forwarding method and a network device such that a new data packet can be matched using a forwarding rule learned by a software layer. Therefore, processing efficiency of the new data packet is improved, and further, network performance is improved.

A first aspect of the present disclosure provides a data packet forwarding method, where the data packet forwarding method is applied to a network device, a self-learning function of a hardware layer of the network device is disabled and is used to maintain a first match table, and a self-learning function of a software layer of the network device is enabled and is used to maintain a second match table, and the method includes receiving a data packet, checking whether an entry that matches the data packet exists in the first match table, obtaining a local physical address and a destination physical address of the data packet if the entry that matches the data packet does not exist in the first match table, determining whether the local physical address is the same as the destination physical address of the data packet, searching the second match table for an entry in which a physical address matches the destination physical address if the local physical address is different from the destination physical address, generating a layer 2 forwarding entry according to the entry that matches the destination physical address, and forwarding the data packet according to the layer 2 forwarding entry.

In a first possible implementation manner of the first aspect, if the local physical address is the same as the destination physical address, the method further includes obtaining a destination IP address of the data packet, searching the second match table for an entry that matches the destination IP address, generating a layer 3 forwarding entry according to the entry that matches the destination IP address, and forwarding the data packet according to the layer 3 forwarding entry.

With reference to the first possible implementation manner of the first aspect, in a second possible implementation manner, a match field of the layer 2 forwarding entry includes the destination physical address of the data packet and a VLAN identifier, and an instruction set of the layer 2 forwarding entry includes an output port number, and a match field of the layer 3 forwarding entry includes at least one of the match entries: an input port number, the destination physical address, the destination IP address, or a source IP address of the data packet, and an instruction set of the layer 3 forwarding entry includes an output port number, a time-to-live (TTL) reduction instruction, and a physical address modification instruction.

With reference to any one of the first aspect, or the first to the second possible implementation manners of the first aspect, in a third possible implementation manner, if the entry that matches the data packet does not exist in the first match table, the method further includes sending the data packet to a controller such that the controller generates a forwarding entry generation instruction, receiving the forwarding entry generation instruction sent by the controller, and generating a forwarding entry in the first match table according to the forwarding entry generation instruction.

In a fourth possible implementation manner of the first aspect, the first match table includes a physical address table, and after generating a layer 2 forwarding entry according to the entry that matches the destination physical address, the method further includes saving the layer 2 forwarding entry in the physical address table of the first match table.

With reference to the fourth possible implementation manner of the first aspect, in a fifth possible implementation manner, after saving the layer 2 forwarding entry in the physical address table of the first match table, the method further includes obtaining an index number of the layer 2 forwarding entry in the first match table, generating a report message, sending the report message to a controller, where the report message includes the index number and the data packet such that the controller generates a forwarding entry generation instruction according to the data packet, and the forwarding entry generation instruction includes the index number, receiving the forwarding entry generation instruction sent by the controller, searching the first match table for the layer 2 forwarding entry according to the index number in the forwarding entry generation instruction, determining whether the layer 2 forwarding entry is the same as a forwarding entry generated under an indication of the forwarding entry generation instruction, and modifying the layer 2 forwarding entry according to the forwarding entry generation instruction if the layer 2 forwarding entry is different from the forwarding entry generated under the indication of the forwarding entry generation instruction.

With reference to the fourth possible implementation manner of the first aspect, in a sixth possible implementation manner, after saving the layer 2 forwarding entry in the physical address table of the first match table, the method further includes obtaining an index number of the layer 2 forwarding entry in the first match table, generating a report message, sending the report message and the layer 2 forwarding entry to a controller, where the report message includes the index number and the data packet such that the controller generates a forwarding entry generation instruction according to the data packet, receiving the forwarding entry generation instruction sent by the controller when the controller determines that a forwarding entry generated under an indication of the forwarding entry generation instruction is different from the layer 2 forwarding entry, where the forwarding entry generation instruction includes the index number, searching the first match table for the layer 2 forwarding entry according to the index number in the forwarding entry generation instruction, and modifying the layer 2 forwarding entry according to the forwarding entry generation instruction.

In a seventh possible implementation manner of the first aspect, the second match table includes a physical address table, and if the entry in which a physical address is the same as the destination physical address does not exist in the second match table, the method further includes recording a source physical address, a VLAN identifier, and an input port number of the data packet in the physical address table of the second match table.

With reference to the first possible implementation manner of the first aspect, in an eighth possible implementation manner, the first match table includes at least one of a routing table or an address resolution protocol (ARP) mapping table, and if the entry that matches the destination IP address does not exist in the second match table, the method further includes creating a new entry in the second match table according to header information of the data packet, marking the created entry as "learning", routing the received data packet using a routing protocol, updating the created entry according to a routing result, and marking a status of the created entry as "learned."

With reference to any one of the first aspect, or the first to the eighth possible implementation manners of the first aspect, in a ninth possible implementation manner, the method further includes receiving at least one entry delivered by the controller, and saving the at least one entry in the second match table.

A second aspect of the present disclosure provides a network device, where a self-learning function of a hardware layer of the network device is disabled and is used to maintain a first match table, and a self-learning function of a software layer of the network device is enabled and is used to maintain a second match table, and the network device includes a packet receiving module configured to receive a data packet, and check whether an entry that matches the data packet exists in the first match table, a service determining module configured to obtain a local physical address and a destination physical address of the data packet if the entry that matches the data packet does not exist in the first match table, and determine whether the local physical address is the same as the destination physical address of the data packet, a layer 2 service processing module configured to search the second match table for an entry in which a physical address matches the destination physical address if the local physical address is different from the destination physical address, and generate a layer 2 forwarding entry according to the entry that matches the destination physical address, and a packet forwarding module configured to forward the data packet according to the layer 2 forwarding entry.

In a first possible implementation manner of the second aspect, the network device further includes a layer 3 service processing module configured to obtain a destination IP address of the data packet if the local physical address is the same as the destination physical address, search the second match table for an entry that matches the destination IP address, and generate a layer 3 forwarding entry according to the entry that matches the destination IP address, and the packet forwarding module is further configured to forward the data packet according to the layer 3 forwarding entry.

With reference to the first possible implementation manner of the second aspect, in a second possible implementation manner, a match field of the layer 2 forwarding entry includes the destination physical address and a VLAN identifier of the data packet, and an instruction set of the layer 2 forwarding entry includes an output port number, and a match field of the layer 3 forwarding entry includes at least one of the match entries: an input port number, the destination physical address, the destination IP address, or a source IP address of the data packet, and an instruction set of the layer 3 forwarding entry includes an output port number, a TTL reduction instruction, and a physical address modification instruction.

With reference to any one of the second aspect, or the first to the second possible implementation manners of the second aspect, in a third possible implementation manner, the packet forwarding module is further configured to send the data packet to a controller if the entry that matches the data packet does not exist in the first match table such that the controller generates a forwarding entry generation instruction, and the network device further includes an instruction receiving module configured to receive the forwarding entry generation instruction sent by the controller, and generate a forwarding entry in the first match table according to the forwarding entry generation instruction.

In a fourth possible implementation manner of the second aspect, the first match table includes a physical address table, and the layer 2 service processing module is further configured to save the layer 2 forwarding entry in the physical address table of the first match table.

With reference to the fourth possible implementation manner of the second aspect, in a fifth possible implementation manner, the network device further includes an index number obtaining module configured to obtain an index number of the layer 2 forwarding entry in the first match table, a report message generation module configured to generate a report message, a report message sending module configured to send the report message to a controller, where the report message includes the index number and the data packet such that the controller generates a forwarding entry generation instruction according to the data packet, and the forwarding entry generation instruction includes the index number, an instruction receiving module configured to receive the forwarding entry generation instruction sent by the controller, and search the first match table for the layer 2 forwarding entry according to the index number in the forwarding entry generation instruction, and an entry determining module configured to determine whether the layer 2 forwarding entry is the same as a forwarding entry generated under an indication of the forwarding entry generation instruction, and the layer 2 service processing module is further configured to modify the layer 2 forwarding entry according to the forwarding entry generation instruction if the layer 2 forwarding entry is different from the forwarding entry generated under the indication of the forwarding entry generation instruction.

With reference to the fourth possible implementation manner of the second aspect, in a sixth possible implementation manner, the network device further includes an index number obtaining module configured to obtain an index number of the layer 2 forwarding entry in the first match table, a report message generation module configured to generate a report message, a report message sending module configured to send the report message and the layer 2 forwarding entry to a controller, where the report message includes the index number and the data packet such that the controller generates a forwarding entry generation instruction according to the data packet, and an instruction receiving module configured to receive the forwarding entry generation instruction sent by the controller when the controller determines that a forwarding entry generated under an indication of the forwarding entry generation instruction is different from the layer 2 forwarding entry, where the forwarding entry generation instruction includes the index number, and the layer 2 service processing module is further configured to search the first match table for the layer 2 forwarding entry according to the index number in the forwarding entry generation instruction, and modify the layer 2 forwarding entry according to the forwarding entry generation instruction.

In a seventh possible implementation manner of the second aspect, the second match table includes a physical address table, and the network device further includes a software learning module configured to record a source physical address, a VLAN identifier, and an input port number of the data packet in the physical address table of the second match table if the entry in which a physical address is the same as the destination physical address does not exist in the second match table.

With reference to the first possible implementation manner of the second aspect, in an eighth possible implementation manner, the first match table includes at least one of a routing table or an ARP mapping table, and the network device further includes a software learning module configured to create a new entry in the second match table according to header information of the data packet if the entry that matches the destination IP address does not exist in the second match table, mark the created entry as "learning", route the received data packet using a routing protocol, update the created entry according to a routing result, and mark a status of the created entry as "learned."

In a ninth possible implementation manner of the second aspect, the network device further includes a software learning module configured to receive at least one entry delivered by the controller, and save the at least one entry in the second match table.

A third aspect of the present disclosure provides a network device, where a self-learning function of a hardware layer of the network device is disabled and is used to maintain a first match table, a self-learning function of a software layer of the network device is enabled and is used to maintain a second match table, the network device includes a network interface, a memory, and a processor, the memory stores a group of programs, and the processor is configured to invoke the program stored in the memory such that the network device performs some or all of steps of the data packet forwarding method provided in the first aspect.

A fourth aspect of the present disclosure further provides a computer storage medium, where the computer storage medium stores a program, and when the program is executed, a computer performs some or all of steps of the data packet forwarding method provided in the first aspect.

The present disclosure is implemented to achieve the following beneficial effects.

In the present disclosure, when checking that an entry that matches a received data packet does not exist in a first match table, a network device obtains a local physical address and a destination physical address of the data packet to perform service determining. If the local physical address is different from the destination physical address, it indicates that the data packet is a layer 2 service, a second match table is searched for an entry in which a physical address is the same as the destination physical address, a layer 2 forwarding entry is generated, and the data packet is forwarded according to the layer 2 forwarding entry. Therefore, a new data packet is matched according to a forwarding rule learned by a software layer such that processing efficiency of the new data packet is improved, and further, network performance is improved.

BRIEF DESCRIPTION OF DRAWINGS

To describe embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In this part, some basic concepts used in the embodiments of the present disclosure are first described. In a transmission control protocol (TCP)/IP reference model and an open systems interconnections (OSI) reference model, data packets at different layers of a model have different names, such as a frame, a data packet, or a packet, and are uniformly referred to as a data packet in the present disclosure for convenience.

The data packet forwarding method provided in the embodiments of the present disclosure is applied to a network device such as a layer 2 switch, a layer 3 switch, or a router. A self-learning function of a hardware layer of the network device is disabled and is used to maintain a first match table, that is, a learning module at the hardware layer cannot learn a received data packet, and each entry in the first match table is delivered by a controller. A self-learning function of a software layer of the network device is enabled and is used to maintain a second match table, that is, a learning module at the software layer can learn a received data packet in order to update the second match table. For how the learning module at the software layer performs self-learning, refer to description corresponding to FIG. 3 to FIG. 6, and details are not described herein.

Figure 1:
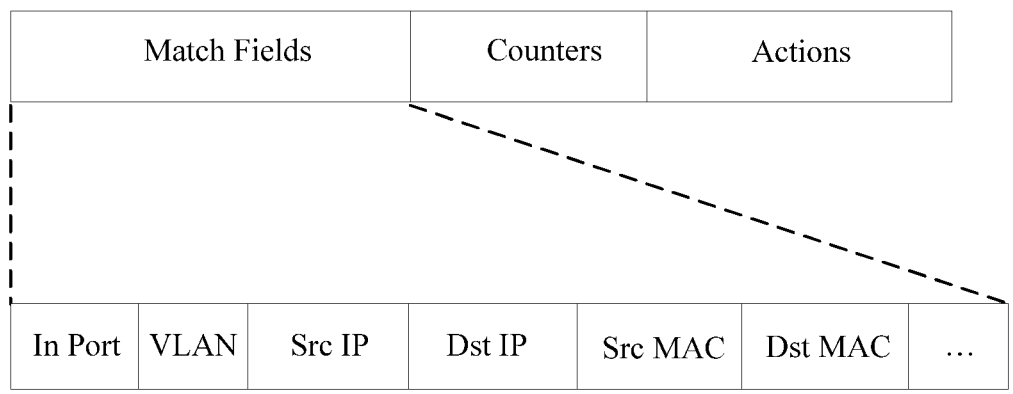
FIG. 1 is a schematic structural diagram of an entry.
Figure 2:
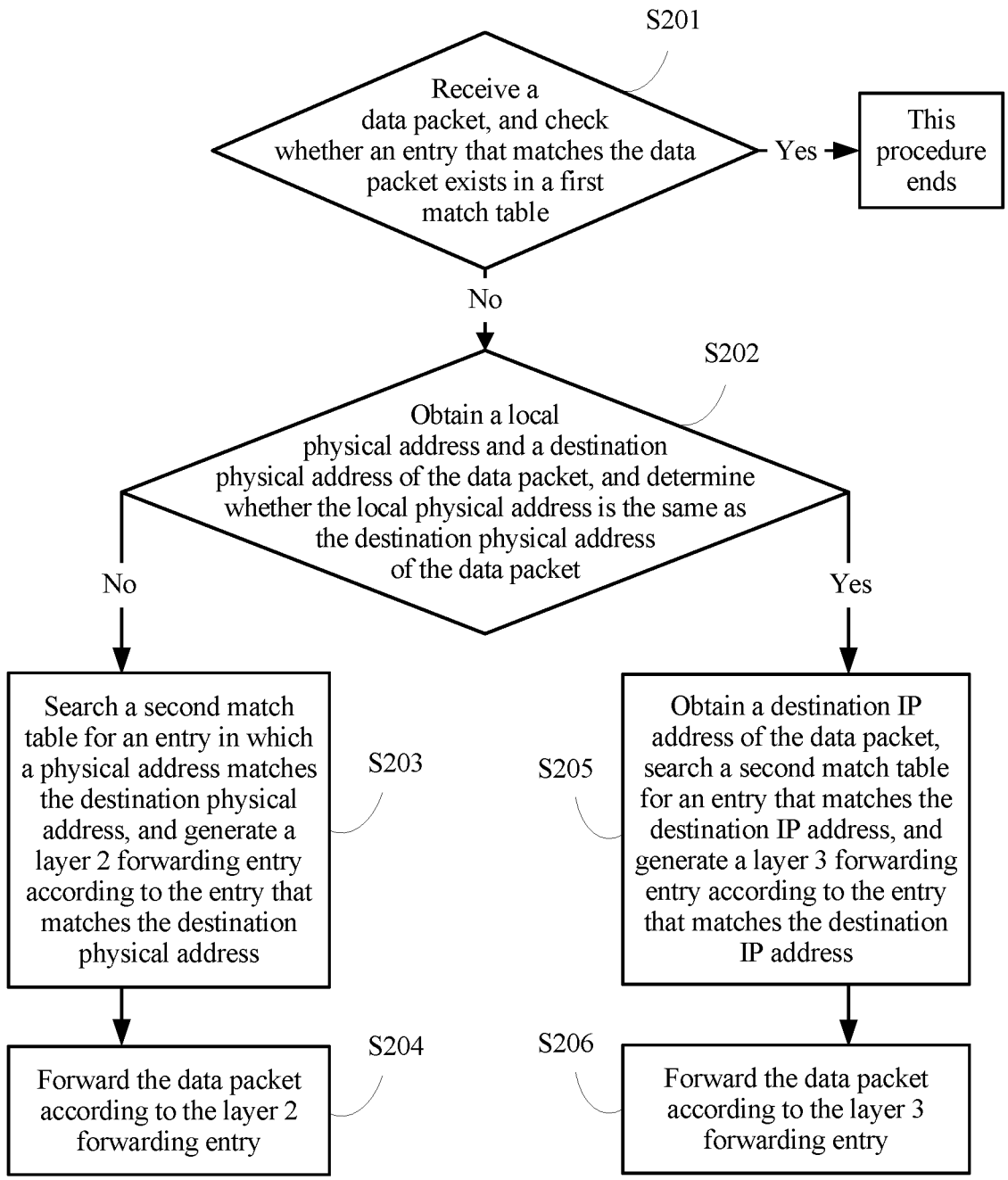
FIG. 2 is a schematic flowchart of a data packet forwarding method according to a first embodiment of the present disclosure.

FIG. 2 is a schematic flowchart of a data packet forwarding method according to a first embodiment of the present disclosure. As shown in FIG. 2, the method may include the following steps.

Step S201: Receive a data packet, and check whether an entry that matches the data packet exists in a first match table, and if the entry that matches the data packet exists in the first match table, this procedure ends, or otherwise, step S202 is performed.

The first match table may include at least one of a physical address table, a routing table, or an ARP mapping table. A network device may first detect a service type of a data packet when receiving the data packet. If the data packet is a layer 2 service, the network device obtains a destination physical address of the data packet and checks whether an entry in which a physical address matches the destination physical address exists in the physical address table. If the entry in which a physical address matches the destination physical address does not exist in the physical address table, it indicates that an entry that matches the data packet does not exist in the first match table, and step S202 is performed. If the data packet is a layer 3 service, the network device obtains a destination IP address of the data packet, and performs a bitwise "AND" operation on the destination IP address and each mask in the routing table. If an operation result is different from a corresponding network address, or if an entry in which an IP address is the same as the destination IP address does not exist after whether the entry in which an IP address is the same as the destination IP address exists in an ARP mapping table of the network device is checked, it indicates that an entry that matches the data packet does not exist in the first match table, and step S202 is performed.

Step S202: Obtain a local physical address and a destination physical address of the data packet, and determine whether the local physical address is the same as the destination physical address of the data packet, and if the local physical address is different from the destination physical address of the data packet, it indicates that the data packet is a layer 2 service, and a processing procedure of the layer 2 service is performed, that is, step S203 is performed, or if the local physical address is the same as the destination physical address of the data packet, it indicates that the data packet is a layer 3 service, and a processing procedure of the layer 3 service is performed, that is, step S205 is performed.

In this embodiment of the present disclosure, when checking that the entry that matches the data packet does not exist in the first match table, the network device further matches the data packet with a second match table. The second match table may be maintained at a software layer of the network device, and a learning module at the software layer has a self-learning function. There are more entries in the second match table than in the first match table such that it is more likely to find the entry that matches the data packet in the second match table. Compared with other approaches in which the data packet is directly sent to a controller and the controller generates a forwarding rule of the data packet, processing efficiency of a new data packet is improved.

Step S203: Search a second match table for an entry in which a physical address matches the destination physical address, and generate a layer 2 forwarding entry according to the entry that matches the destination physical address.

The second match table includes a physical address table. For the layer 2 service, the network device obtains the destination physical address of the data packet, and queries whether the entry in which a physical address matches the destination physical address exists in the physical address table of the second match table. If the entry in which a physical address matches the destination physical address exists in the physical address table of the second match table, the layer 2 forwarding entry is generated according to the entry that matches the destination physical address. A match field of the layer 2 forwarding entry includes the destination physical address and a VLAN identifier of the data packet. An instruction set of the layer 2 forwarding entry includes an output port number, and the output port number is determined according to an output port number of a matched entry in the second match table.

If the entry in which a physical address matches the destination physical address does not exist in the second match table, the network device may further record a source physical address, a VLAN identifier, and an input port number of the data packet in the physical address table of the second match table. The network device tries to learn as many received data packets as possible such that there are as many physical address tables of the second match table as possible, and a success rate of data packet routing can be improved. It is assumed that a source physical address of a data packet A is 11-22-33-44-55-66, a destination physical address is 22-22-33-44-55-77, a VLAN identifier is 11, the data packet A is accessed using a port 1 of the network device, and the network device checks that an entry in which a physical address is 22-22-33-44-55-77 does not exist in the physical address table of the second match table. Therefore, a new entry is created in the physical address table of the second match table, and the source physical address, the VLAN identifier, and the input port number are filled in the newly-created entry. When a data packet whose destination physical address is 11-22-33-44-55-66 is received, a forwarding rule of the data packet may be determined. If information about the data packet A is not recorded, when the data packet whose destination physical address is 11-22-33-44-55-66 is received, a forwarding rule of the data packet cannot be found.

Further, the network device may first check whether an entry in which a physical address matches the source physical address exists in the second match table. If the entry in which a physical address matches the source physical address does not exist in the second match table, the source physical address, the VLAN identifier, and the input port number of the data packet are recorded in the physical address table of the second match table such that memory space can be saved.

For the second match table, the network device may further periodically send an update request to a controller to update the locally stored second match table, or the controller may periodically and actively deliver the second match table to the network device to update the second match table locally stored on the network device.

It should be noted that if the entry that matches the data packet does not exist in the second match table either, the network device may process the data packet according to a processing method in the other approaches, such as discarding the data packet or forwarding the data packet using a default output port.

Step S204: Forward the data packet according to the layer 2 forwarding entry.

The generated layer 2 forwarding entry is delivered to hardware. Further, the data packet may be forwarded according to the layer 2 forwarding entry. It should be noted that a person skilled in the art understands how the network device forwards the data packet according to the layer 2 forwarding entry, reference may be made to the other approaches in which a data packet is forwarded according to a matched entry in a first match table, and details are not described herein.

Step S205: Obtain a destination IP address of the data packet, search the second match table for an entry that matches the destination IP address, and generate a layer 3 forwarding entry according to the entry that matches the destination IP address.

The second match table includes at least one of a routing table or an ARP mapping table. For the layer 3 service, the network device obtains the destination IP address of the data packet, and performs a bitwise "AND" operation on the destination IP address and each mask in the routing table. If an operation result is the same as a corresponding network address, the layer 3 forwarding entry is generated according to an entry of the network device, or the network device checks whether an entry in which an IP address is the same as the destination IP address exists in the ARP mapping table of the network device, if the entry in which an IP address is the same as the destination IP address exists in the ARP mapping table, the layer 3 forwarding entry is generated according to the entry that matches the destination IP address.

A match field of the layer 3 forwarding entry includes at least one of the following match entries an input port number, the destination physical address, the destination IP address, or a source IP address of the data packet. An instruction set of the layer 3 forwarding entry includes an output port number, a TTL reduction instruction, and a physical address modification instruction. The output port number is determined according to an output port number of a matched entry in the second match table. The TTL reduction instruction is used to reduce TTL. The physical address modification instruction is used to modify a source physical address and a destination physical address. Optionally, the layer 3 forwarding entry may further include an Ethernet type of the data packet.

If the entry that matches the destination IP address does not exist in the second match table, the network device may further create a new entry in the second match table according to header information of the data packet, mark the created entry as "learning," route the received data packet using a routing protocol, update the created entry according to a routing result, and mark a status of the created entry as "learned." In an implementation, the network device may query an adjacent network device about existence of a forwarding rule of the data packet. If the forwarding rule of the data packet exists in the adjacent network device, the created entry is updated according to the adjacent network device. For example, the output port number is determined according to a number of an output port, on which the adjacent network device is located, of the local network device. For another example, the destination physical address is determined according to a physical address of the adjacent network device. The entry is marked as "learned" when the created entry is updated.

It may be understood that a learning module at a software layer of the network device may learn the received data packet using a learning method in the other approaches. The learning method provided in this embodiment of the present disclosure is only an optional implementation manner, and cannot be used to limit the present disclosure.

Step S206: Forward the data packet according to the layer 3 forwarding entry.

The generated layer 3 forwarding entry is delivered to hardware. Further, the data packet may be forwarded according to the layer 3 forwarding entry. It should be noted that a person skilled in the art understands how the network device forwards the data packet according to the layer 3 forwarding entry, reference may be made to the other approaches in which a data packet is forwarded according to a matched entry in a first match table, and details are not described herein.

In the embodiment shown in FIG. 2, when checking that an entry that matches a received data packet does not exist in a first match table, a network device obtains a local physical address and a destination physical address of the data packet to perform service determining. If the local physical address is different from the destination physical address, it indicates that the data packet is a layer 2 service, a second match table is searched for an entry in which a physical address matches the destination physical address, a layer 2 forwarding entry is generated, and the data packet is forwarded according to the layer 2 forwarding entry. If the local physical address is the same as the destination physical address, it indicates that the data packet is a layer 3 service, a second match table is searched for an entry in which an IP address matches a destination IP address of the data packet, a layer 3 forwarding entry is generated, and the data packet is forwarded according to the layer 3 forwarding entry. Therefore, a new data packet is matched according to a forwarding rule learned by a software layer such that processing efficiency of the new data packet is improved, and further, network performance is improved.

Figure 3:
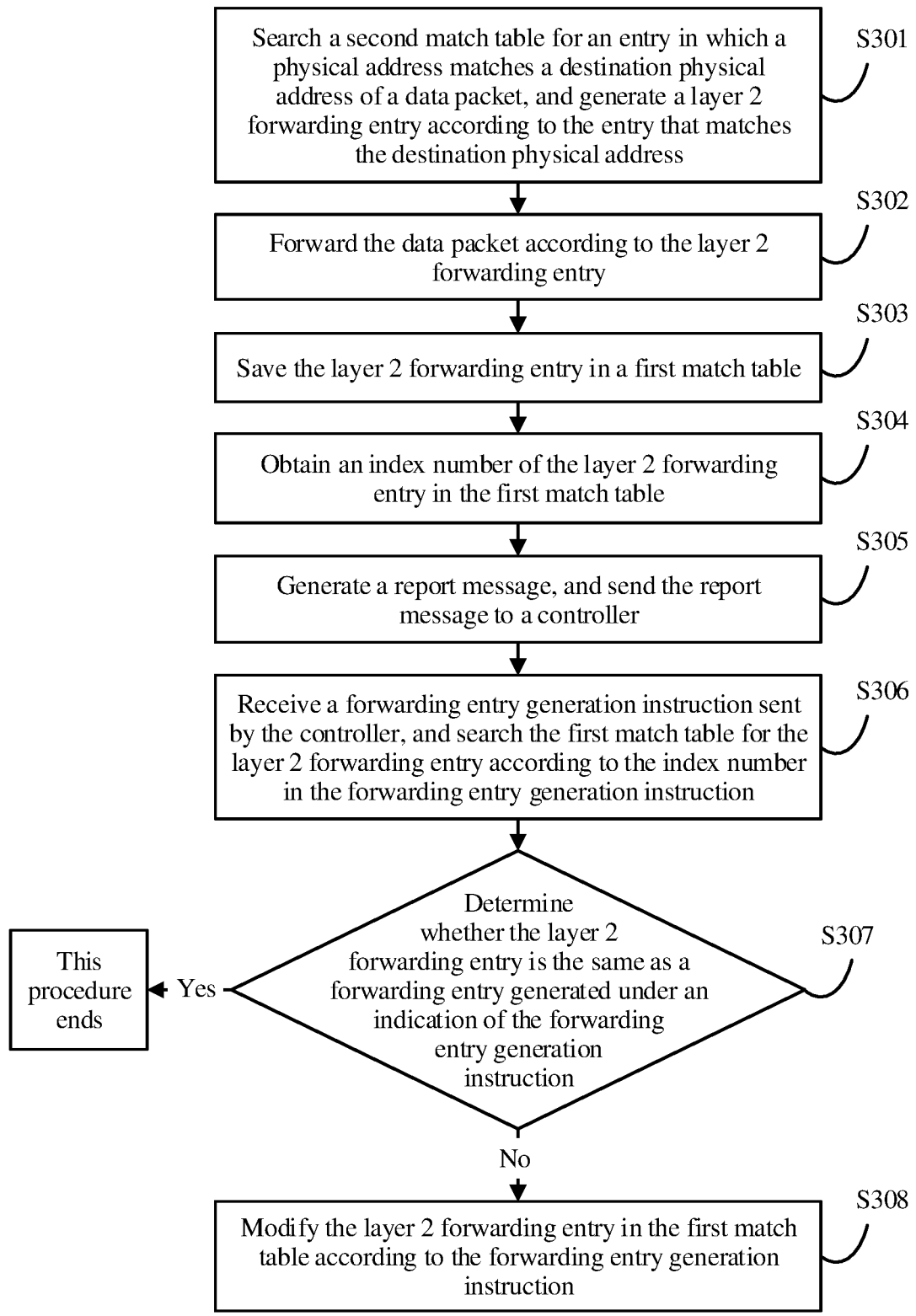
FIG. 3 is a schematic flowchart of a layer 2 service processing method according to a second embodiment of the present disclosure.

FIG. 3 is a schematic flowchart of a layer 2 service processing method according to a second embodiment of the present disclosure. The method provided in this embodiment is performed when an entry that matches a received data packet does not exist in a first match table and it is determined that a local physical address does not match a destination physical address of the data packet. As shown in FIG. 3, the method in this embodiment may include the following steps.

Step S301: Search a second match table for an entry in which a physical address matches a destination physical address of a data packet, and generate a layer 2 forwarding entry according to the entry that matches the destination physical address.

Step S302: Forward the data packet according to the layer 2 forwarding entry.

Step S303: Save the layer 2 forwarding entry in a first match table.

It may be understood that steps S302 and S303 are not performed in a strict order, or the two steps may be simultaneously performed.

Step S304: Obtain an index number of the layer 2 forwarding entry in the first match table.

The index number is a location of the layer 2 forwarding entry in the first match table. A representation form of the index number is not limited in the present disclosure.

Step S305: Generate a report message, and send the report message to a controller, where the report message includes the index number and the data packet such that the controller generates a forwarding entry generation instruction according to the data packet, and the forwarding entry generation instruction includes the index number.

The report message may be a packed in message. The report message may include a reason field in addition to the data packet and the index number of the layer 2 forwarding entry in the first match table. The reason field is "post-event report."

The network device sends the generated report message to the controller such that the controller generates the forwarding entry generation instruction according to the data packet.

Step S306: Receive the forwarding entry generation instruction sent by the controller, and search the first match table for the layer 2 forwarding entry according to the index number in the forwarding entry generation instruction.

Step S307: Determine whether the layer 2 forwarding entry is the same as a forwarding entry generated under an indication of the forwarding entry generation instruction, and if the layer 2 forwarding entry is different from the forwarding entry generated under the indication of the forwarding entry generation instruction, step S308 is performed, or otherwise, this procedure ends.

Step S308: Modify the layer 2 forwarding entry in the first match table according to the forwarding entry generation instruction.

In a packet switched network, communication data is first segmented and encapsulated into multiple data packets on a source host node such that a network device may consecutively route the multiple data packets. In the embodiment shown in FIG. 3, when an entry that matches a received data packet does not exist in a first match table and it is determined that a local physical address is different from a destination physical address of the data packet, a network device may further save a generated layer 2 forwarding entry in the first match table. When subsequent data packet is received, a matched entry may be directly found in the first match table. Compared with the previous embodiment, overall processing efficiency of the communication data is improved.

Further, the network device may report this event to a controller. If a forwarding entry generated by the controller under an indication of the data packet is different from the layer 2 forwarding entry, the network device may further modify the layer 2 forwarding entry according to a forwarding entry generation instruction such that routing accuracy is improved.

Figure 4:
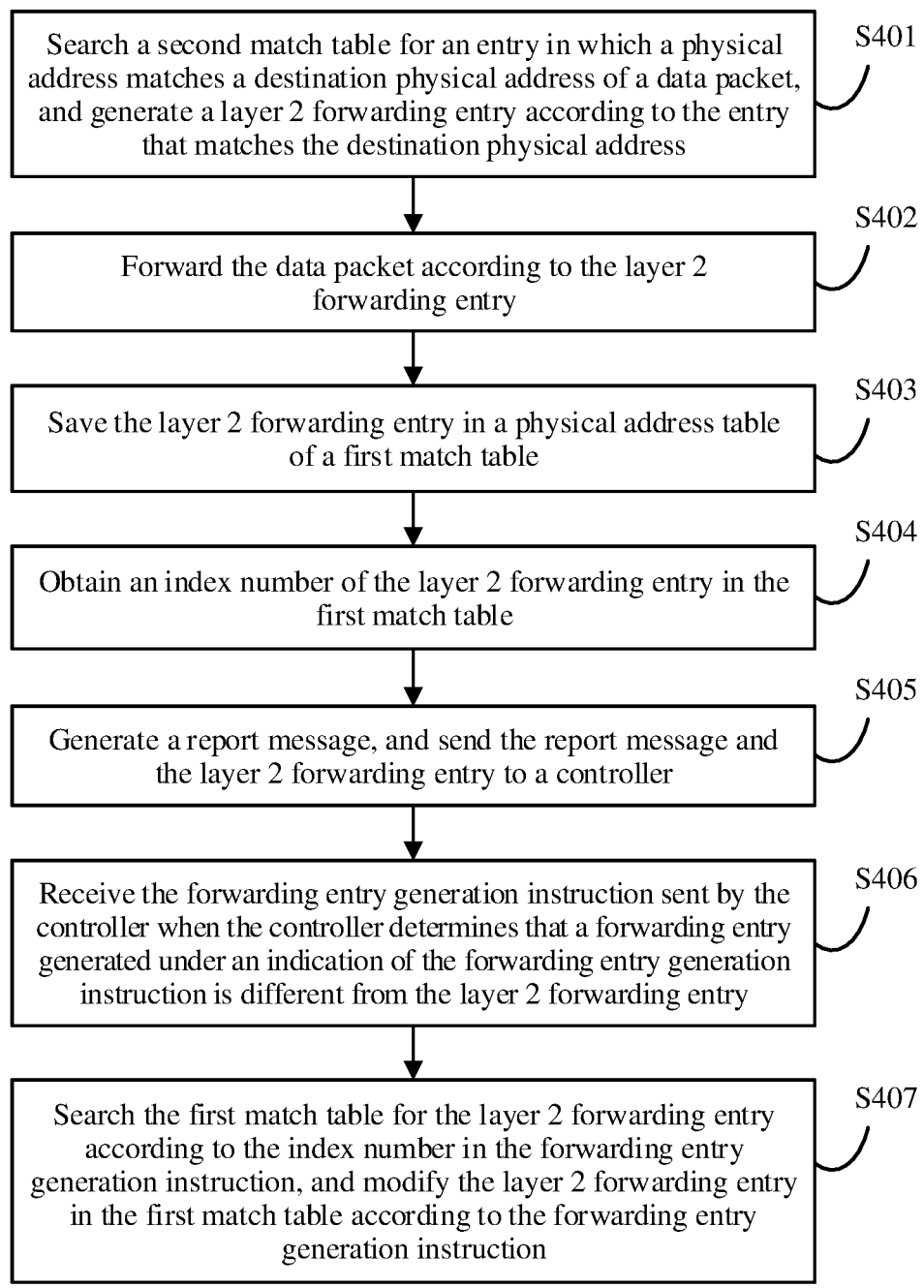
FIG. 4 is a schematic flowchart of another layer 2 service processing method according to a third embodiment of the present disclosure.

FIG. 4 is a schematic flowchart of another layer 2 service processing method according to a third embodiment of the present disclosure. The method provided in this embodiment is performed when an entry that matches a received data packet does not exist in a first match table and it is determined that a local physical address is different from a destination physical address of the data packet. As shown in FIG. 4, the method in this embodiment may include the following steps.

Step S401: Search a second match table for an entry in which a physical address matches a destination physical address of a data packet, and generate a layer 2 forwarding entry according to the entry that matches the destination physical address.

Step S402: Forward the data packet according to the layer 2 forwarding entry.

Step S403: Save the layer 2 forwarding entry in a physical address table of a first match table.

It may be understood that steps S402 and S403 are not performed in a strict order, or the two steps may be simultaneously performed.

Step S404: Obtain an index number of the layer 2 forwarding entry in the first match table.

Step S405: Generate a report message, and send the report message and the layer 2 forwarding entry to a controller, where the report message includes the index number and the data packet such that the controller generates a forwarding entry generation instruction according to the data packet.

The report message may be a packed in message. The report message may include a reason field in addition to the data packet and the index number of the layer 2 forwarding entry in the first match table. The reason field is "post-event report."

Step S406: Receive the forwarding entry generation instruction sent by the controller when the controller determines that a forwarding entry generated under an indication of the forwarding entry generation instruction is different from the layer 2 forwarding entry, where the forwarding entry generation instruction includes the index number.

Step S407: Search the first match table for the layer 2 forwarding entry according to the index number in the forwarding entry generation instruction, and modify the layer 2 forwarding entry in the first match table according to the forwarding entry generation instruction.

In the embodiment shown in FIG. 4, when an entry that matches a received data packet does not exist in a first match table and it is determined that a local physical address is different from a destination physical address of the data packet, a network device may further save a generated layer 2 forwarding entry in the first match table. A matched entry may be directly found in the first match table when subsequent data packet is received. Compared with the first embodiment, overall processing efficiency of communication data is improved.

Further, the network device may further send the generated layer 2 forwarding entry to a controller. The controller determines whether a forwarding entry generated under an indication of the received data packet is the same as the layer 2 forwarding entry. If the forwarding entry generated under the indication of the received data packet is the same as the layer 2 forwarding entry, this procedure ends. If the forwarding entry generated under the indication of the received data packet is different from the layer 2 forwarding entry, the network device may receive a forwarding entry generation instruction delivered by the controller, and directly modify the layer 2 forwarding entry according to the forwarding entry generation instruction such that routing accuracy is improved.

Figure 5:
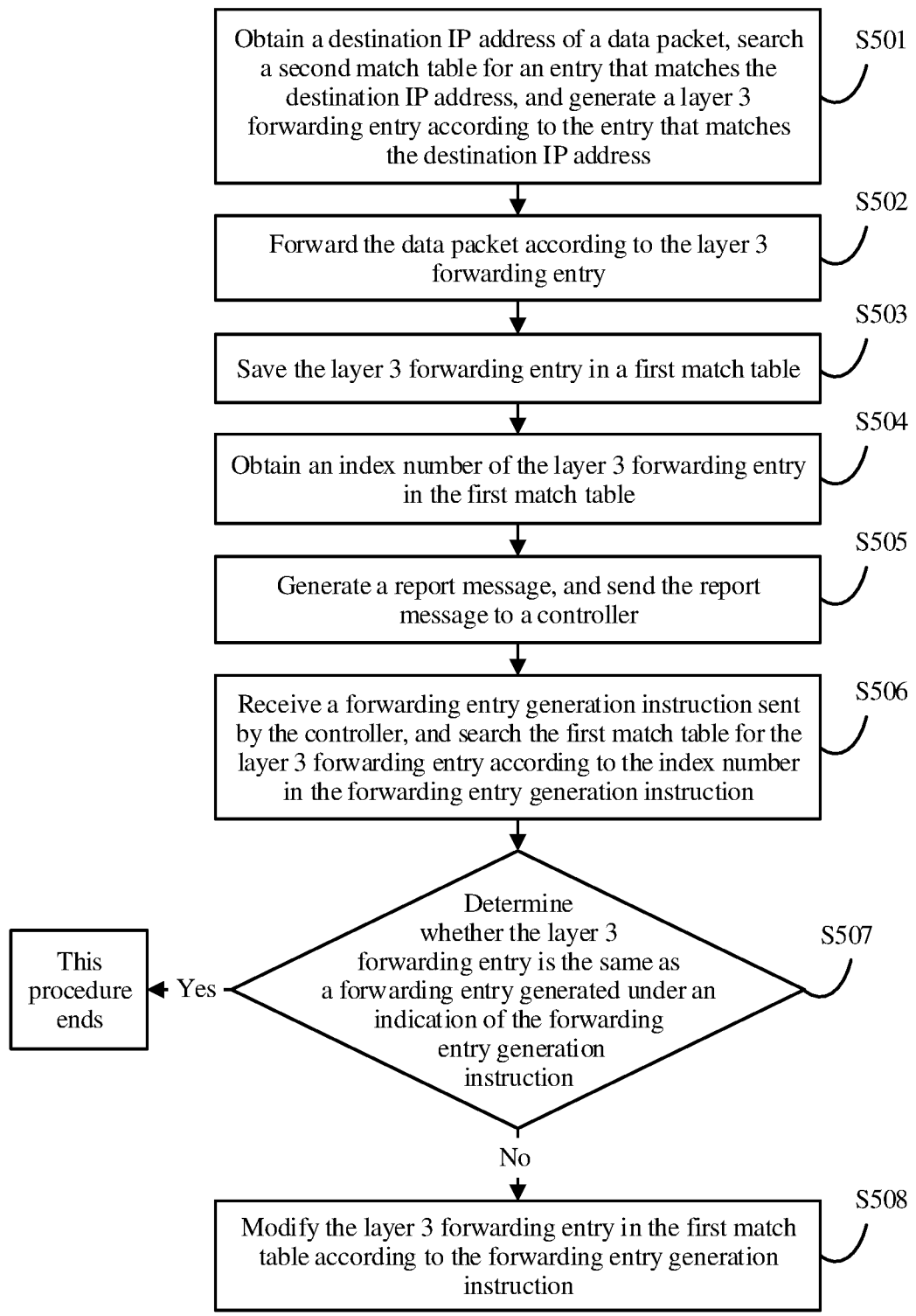
FIG. 5 is a schematic flowchart of a layer 3 service processing method according to a fourth embodiment of the present disclosure.

FIG. 5 is a schematic flowchart of a layer 3 service processing method according to a fourth embodiment of the present disclosure. The method provided in this embodiment is performed when an entry that matches a received data packet does not exist in a first match table and it is determined that a local physical address is the same as a destination physical address of the data packet. As shown in FIG. 5, the method in this embodiment may include the following steps.

Step S501: Obtain a destination IP address of a data packet, search a second match table for an entry that matches the destination IP address, and generate a layer 3 forwarding entry according to the entry that matches the destination IP address.

Step S502: Forward the data packet according to the layer 3 forwarding entry.

Step S503: Save the layer 3 forwarding entry in a first match table.

It may be understood that steps S502 and S503 are not performed in a strict order, or the two steps may be simultaneously performed.

Step S504: Obtain an index number of the layer 3 forwarding entry in the first match table.

The index number is a location of the layer 3 forwarding entry in the first match table. A representation form of the index number is not limited in the present disclosure.

Step S505: Generate a report message, and send the report message to a controller, where the report message includes the index number and the data packet such that the controller generates a forwarding entry generation instruction according to the data packet, and the forwarding entry generation instruction includes the index number.

The report message may be a packed in message. The report message may include a reason field in addition to the data packet and the index number of the layer 3 forwarding entry in the first match table. The reason field is "post-event report."

The network device sends the generated report message to the controller such that the controller generates the forwarding entry generation instruction according to the data packet.

Step S506: Receive the forwarding entry generation instruction sent by the controller, and search the first match table for the layer 3 forwarding entry according to the index number in the forwarding entry generation instruction.

Step S507: Determine whether the layer 3 forwarding entry is the same as a forwarding entry generated under an indication of the forwarding entry generation instruction, and if the layer 3 forwarding entry is different from the forwarding entry generated under the indication of the forwarding entry generation instruction, step S508 is performed, or otherwise, this procedure ends.

Step S508: Modify the layer 3 forwarding entry in the first match table according to the forwarding entry generation instruction.

In the embodiment shown in FIG. 5, when an entry that matches a received data packet does not exist in a first match table and it is determined that a local physical address is the same as a destination physical address of the data packet, a network device may further save a generated layer 3 forwarding entry in the first match table. When subsequent data packet is received, a matched entry may be directly found in the first match table. Compared with the previous embodiment, overall processing efficiency of communication data is improved.

Further, the network device may further report this event to a controller. If a forwarding entry generated by the controller under an indication of the data packet is different from the layer 3 forwarding entry, the network device may further modify the layer 3 forwarding entry according to a forwarding entry generation instruction such that routing accuracy is improved.

Figure 6:
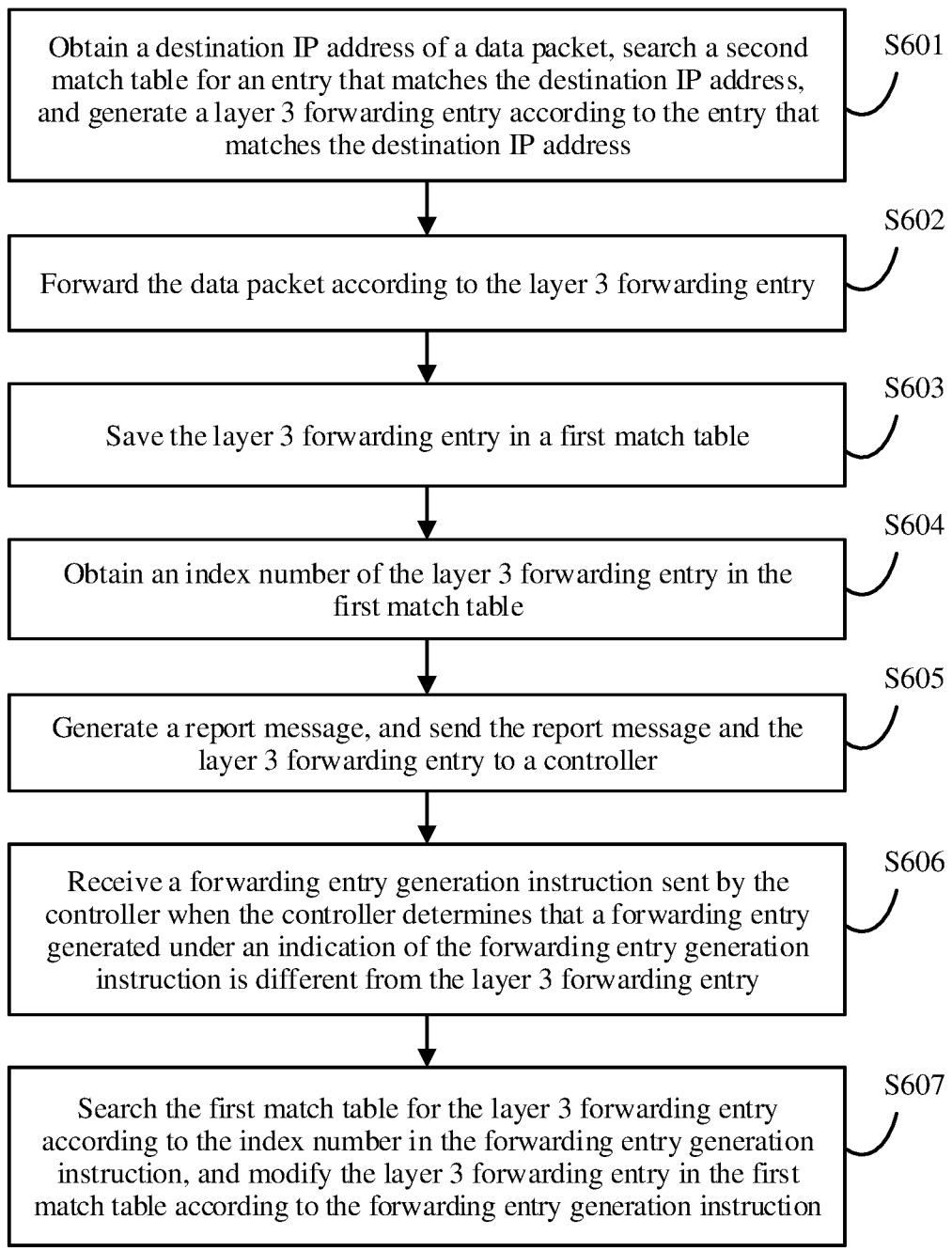
FIG. 6 is a schematic flowchart of another layer 3 service processing method according to a fifth embodiment of the present disclosure.

FIG. 6 is a schematic flowchart of another layer 3 service processing method according to a fifth embodiment of the present disclosure. The method provided in this embodiment is performed when an entry that matches a received data packet does not exist in a first match table and it is determined that a local physical address is the same as a destination physical address of the data packet. As shown in FIG. 6, the method in this embodiment may include the following steps.

Step S601: Obtain a destination IP address of a data packet, search a second match table for an entry that matches the destination IP address, and generate a layer 3 forwarding entry according to the entry that matches the destination IP address.

Step S602: Forward the data packet according to the layer 3 forwarding entry.

Step S603: Save the layer 3 forwarding entry in a first match table.

It may be understood that steps S602 and S603 are not performed in a strict order, or the two steps may be simultaneously performed.

Step S604: Obtain an index number of the layer 3 forwarding entry in the first match table.

Step S605: Generate a report message, and send the report message and the layer 3 forwarding entry to a controller, where the report message includes the index number and the data packet such that the controller generates a forwarding entry generation instruction according to the data packet.

The report message may be a packed in message. The report message may include a reason field in addition to the data packet and the index number of the layer 3 forwarding entry in the first match table. The reason field is "post-event report."

Step S606: Receive the forwarding entry generation instruction sent by the controller when the controller determines that a forwarding entry generated under an indication of the forwarding entry generation instruction is different from the layer 3 forwarding entry, where the forwarding entry generation instruction includes the index number.

Step S607: Search the first match table for the layer 3 forwarding entry according to the index number in the forwarding entry generation instruction, and modify the layer 3 forwarding entry in the first match table according to the forwarding entry generation instruction.

In the embodiment shown in FIG. 6, when an entry that matches a received data packet does not exist in a first match table and it is determined that a local physical address is the same as a destination physical address of the data packet, a network device may further save a generated layer 3 forwarding entry in the first match table. When subsequent data packet is received, a matched entry may be directly found in the first match table. Compared with the first embodiment, overall processing efficiency of communication data is improved.

Further, the network device may send the generated layer 3 forwarding entry to a controller. The controller determines whether a forwarding entry generated under an indication of the received data packet is the same as the layer 3 forwarding entry. If the forwarding entry generated under the indication of the received data packet is the same as the layer 3 forwarding entry, this procedure ends. If the forwarding entry generated under the indication of the received data packet is different from the layer 3 forwarding entry, the network device may receive a forwarding entry generation instruction delivered by the controller, and directly update the layer 3 forwarding entry according to an entry in configuration information such that routing accuracy is improved.

Figure 7A:
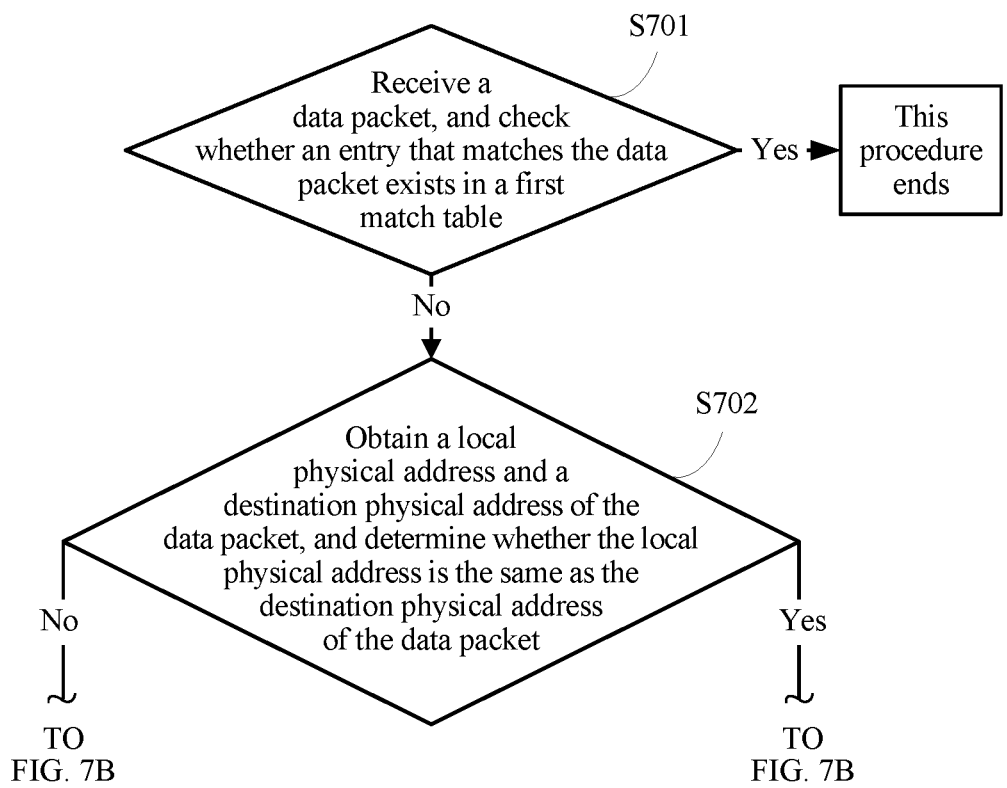
FIG. 7A and FIG. 7B are a schematic flowchart of another data packet forwarding method according to a sixth embodiment of the present disclosure.
Figure 7B:
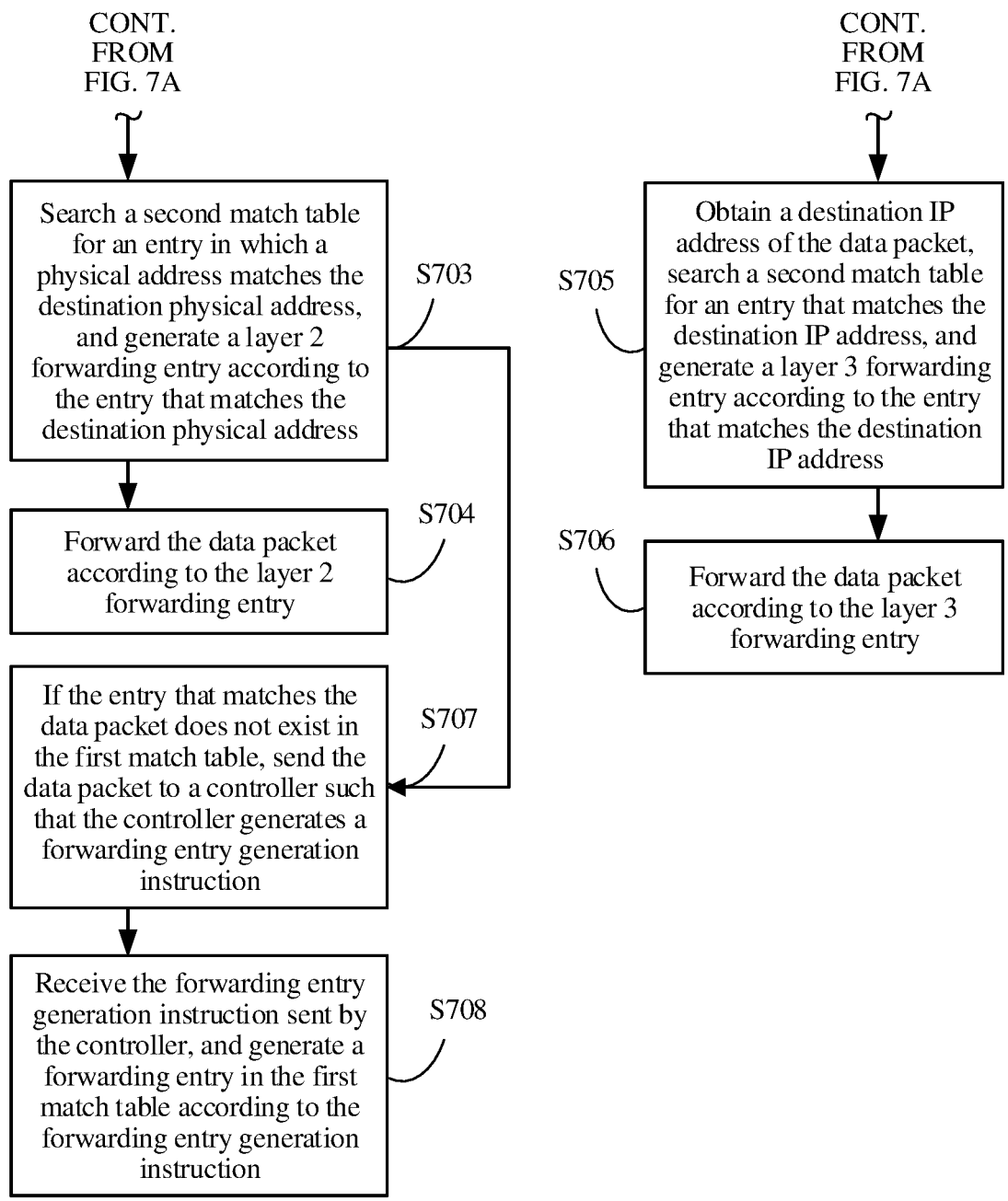

FIG. 7A and FIG. 7B are a schematic flowchart of another data packet forwarding method according to a sixth embodiment of the present disclosure. A difference between the method in this embodiment and that in the first embodiment is as follows. As shown in FIG. 7A and FIG. 7B, in addition to steps S701 to S706 corresponding to steps S201 to S206 that are in the first embodiment, the method in this embodiment further includes the following steps.

Step S707: If the entry that matches the data packet does not exist in the first match table, send the data packet to a controller such that the controller generates a forwarding entry generation instruction.

Step S708: Receive the forwarding entry generation instruction sent by the controller, and generate a forwarding entry in the first match table according to the forwarding entry generation instruction.

In the embodiment shown in FIG. 7A and FIG. 7B, when an entry that matches a data packet does not exist in a first match table, the data packet is sent to a controller such that the controller delivers a corresponding forwarding entry generation instruction, and generates a forwarding entry in the first match table according to the forwarding entry generation instruction. When subsequent data packet is received, a matched entry may be directly found in the first match table. Compared with the previous embodiment, overall processing efficiency of communication data is improved.

It may be understood that the third embodiment and the fifth embodiment, or the third embodiment and the sixth embodiment may simultaneously exist in a same embodiment, or the fourth embodiment and the fifth embodiment, or the fourth embodiment and the sixth embodiment may simultaneously exist in a same embodiment, or only a case in which any one of the foregoing embodiments is combined with the other approaches may be used in one embodiment. This is not limited in the present disclosure.

Figure 8:
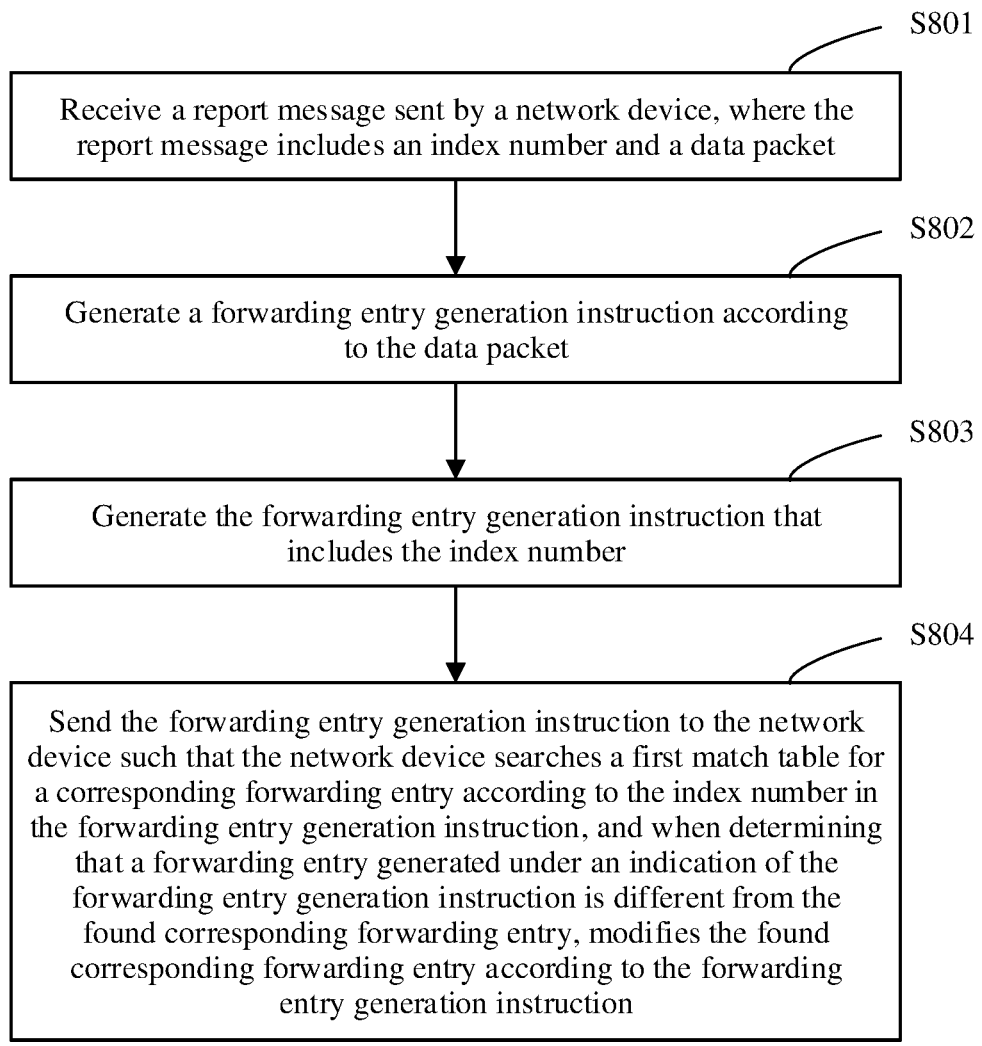
FIG. 8 is a schematic flowchart of a match table update method according to a seventh embodiment of the present disclosure.

FIG. 8 is a schematic flowchart of a match table update method according to a seventh embodiment of the present disclosure. The method in this embodiment is described from a perspective of a controller. As shown in FIG. 8, the method in this embodiment may include the following steps.

Step S801: Receive a report message sent by a network device, where the report message includes the index number and the data packet.

The index number is a storage location that is in a second match table and that is of a forwarding entry generated by the network device. The generated forwarding entry may be a layer 2 forwarding entry or a layer 3 forwarding entry.

Step S802: Generate a forwarding entry generation instruction according to the data packet.

It may be understood that a person skilled in the art understands how the controller generates the forwarding entry generation instruction according to the received data packet, and details are not described herein.

Step S803: Generate a forwarding entry generation instruction that includes the index number.

Step S804: Send the forwarding entry generation instruction to the network device such that the network device searches the first match table for a corresponding forwarding entry according to the index number in the forwarding entry generation instruction, and when determining that a forwarding entry generated under an indication of the forwarding entry generation instruction is different from the found corresponding forwarding entry, modifies the found corresponding forwarding entry according to the forwarding entry generation instruction.

The controller may further receive the data packet sent by the network device when the network device cannot find, in the first match table, an entry that matches the data packet. The controller generates the forwarding entry generation instruction according to the data packet, and then sends the forwarding entry generation instruction to the network device such that the network device generates a forwarding entry according to the forwarding entry generation instruction, and saves the generated forwarding entry in the first match table.

The controller may periodically send the second match table to the network device such that the network device periodically updates the second match table locally stored on the network device.

The controller may send the second match table to the network device only when receiving an update request sent by the network device for the second match table.

Figure 9:
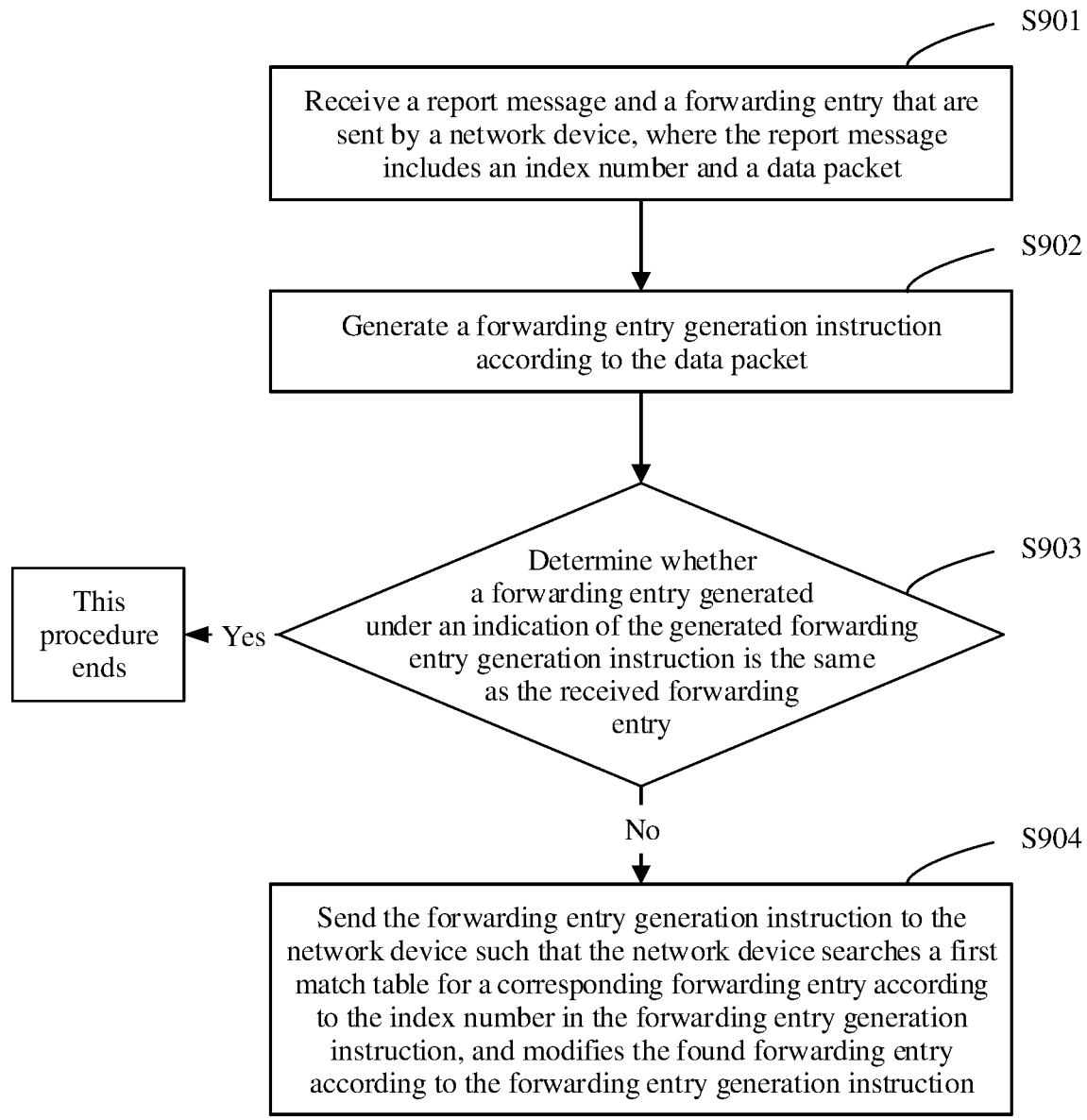
FIG. 9 is a schematic flowchart of another match table update method according to an eighth embodiment of the present disclosure.

FIG. 9 is a schematic flowchart of another match table update method according to an eighth embodiment of the present disclosure. The method in this embodiment is described from a perspective of a controller. As shown in FIG. 9, the method in this embodiment may include the following steps.

Step S901: Receive a report message and a forwarding entry that are sent by a network device, where the report message includes the index number and the data packet.

The index number is a storage location that is in a second match table and that is of the forwarding entry generated by the network device. The generated forwarding entry may be a layer 2 forwarding entry or a layer 3 forwarding entry.

The forwarding entry may be in the report message, or may be independent from the report message.

Step S902: Generate a forwarding entry generation instruction according to the data packet.

It may be understood that a person skilled in the art understands how the controller generates the forwarding entry generation instruction according to the received data packet, and details are not described herein.

Step S903: Determine whether a forwarding entry generated under an indication of the generated forwarding entry generation instruction is the same as the received forwarding entry, and if the forwarding entry generated under the indication of the generated forwarding entry generation instruction is the same as the received forwarding entry, this procedure ends, or otherwise, step S904 is performed.

Step S904: Send the forwarding entry generation instruction to the network device such that the network device searches the first match table for a corresponding forwarding entry according to the index number in the forwarding entry generation instruction, and modifies the found forwarding entry according to the forwarding entry generation instruction.

The controller may further receive the data packet sent by the network device when the network device cannot find, in the first match table, an entry that matches the data packet. The controller generates the forwarding entry generation instruction according to the data packet, and then sends the forwarding entry generation instruction to the network device such that the network device generates a forwarding entry according to the forwarding entry generation instruction, and saves the generated forwarding entry in the first match table.

The controller may periodically send the second match table to the network device such that the network device periodically updates the second match table locally stored on the network device.

The controller may send the second match table to the network device only when receiving an update request sent by the network device for the second match table.

Figure 10:
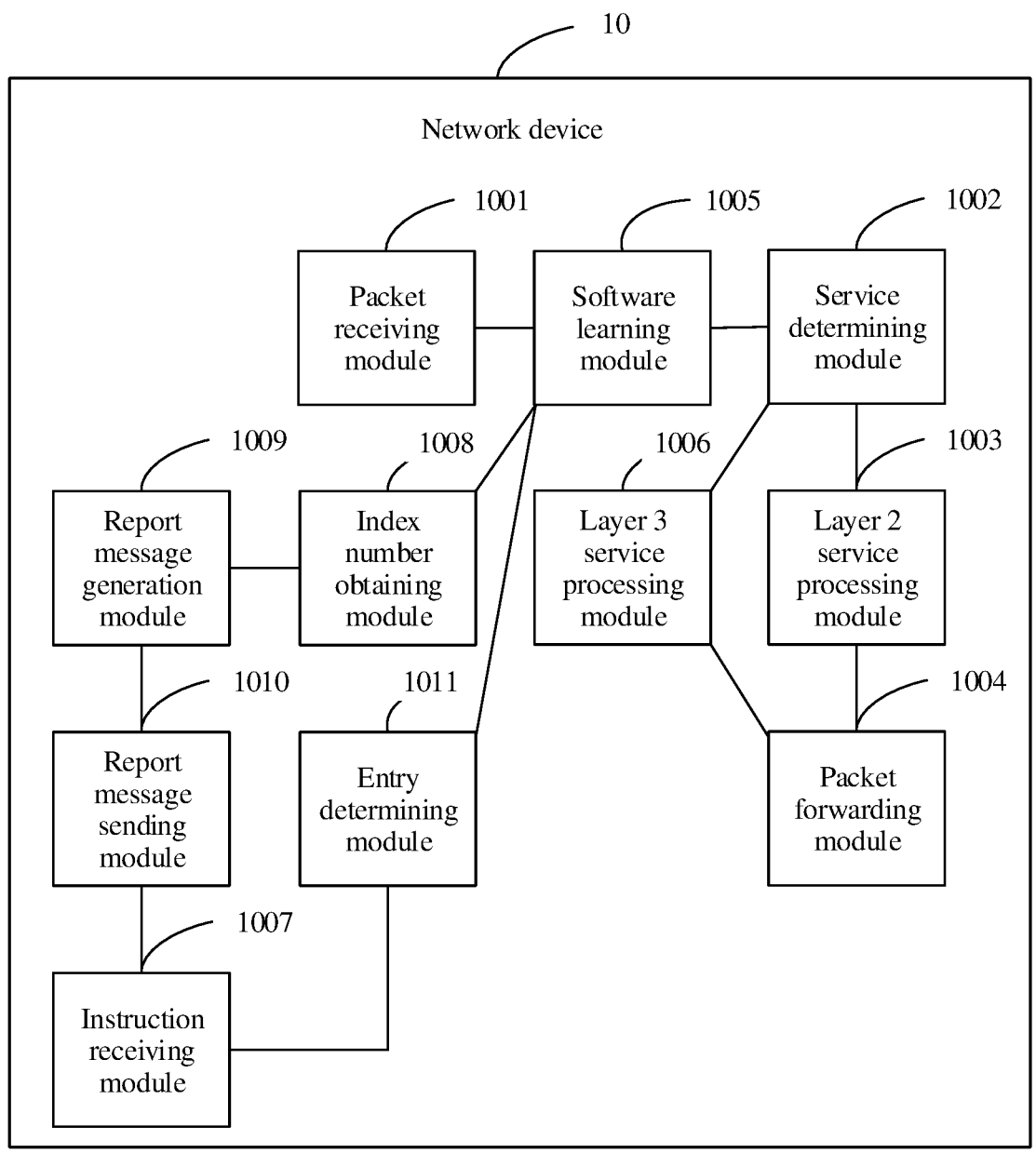
FIG. 10 is a schematic structural diagram of a network device according to a ninth embodiment of the present disclosure.

FIG. 10 is a schematic structural diagram of a network device 10 according to a ninth embodiment of the present disclosure. A self-learning function of a hardware layer of the network device 10 is disabled and is used to maintain a first match table, and a self-learning function of a software layer of the network device 10 is enabled and is used to maintain a second match table. As shown in FIG. 10, the network device 10 may include at least a packet receiving module 1001, a service determining module 1002, a layer 2 service processing module 1003, and a packet forwarding module 1004.

The packet receiving module 1001 is configured to receive a data packet, and check whether an entry that matches the data packet exists in the first match table.

The service determining module 1002 is configured to obtain a local physical address and a destination physical address of the data packet if the entry that matches the data packet does not exist in the first match table, and determine whether the local physical address is the same as the destination physical address of the data packet.

The layer 2 service processing module 1003 is configured to search the second match table for an entry in which a physical address matches the destination physical address if the local physical address is different from the destination physical address, and generate a layer 2 forwarding entry according to the entry that matches the destination physical address.

As shown in FIG. 10, the network device 10 may further include a software learning module 1005 configured to record a source physical address, a VLAN identifier, and an input port number of the data packet in a physical address table of the second match table if the entry in which a physical address matches the destination physical address does not exist in the second match table.

The packet forwarding module 1004 is configured to forward the data packet according to the layer 2 forwarding entry.

The network device 10 may further include a layer 3 service processing module 1006 configured to search the second match table for an entry that matches the destination IP address if the local physical address is the same as the destination physical address, obtain a destination IP address of the data packet, and generate a layer 3 forwarding entry according to the entry that matches the destination IP address.

The packet forwarding module 1004 is further configured to forward the data packet according to the layer 3 forwarding entry.

The software learning module 1005 may be configured to create a new entry in the second match table according to header information of the data packet if the entry that matches the destination IP address does not exist in the second match table, mark the created entry as "learning," route the received data packet using a routing protocol, update the created entry according to a routing result, and mark a status of the created entry as "learned."

The software learning module 1005 may be further configured to receive at least one entry delivered by the controller, and save the at least one entry in the second match table.

A match field of the layer 2 forwarding entry includes the destination physical address and a VLAN identifier of the data packet, and an instruction set of the layer 2 forwarding entry includes an output port number.

A match field of the layer 3 forwarding entry includes at least one of the following match entries an input port number, the destination physical address, the destination IP address, or a source IP address of the data packet, and an instruction set of the layer 3 forwarding entry includes an output port number, a TTL reduction instruction, and a physical address modification instruction.

Optionally, the packet forwarding module 1004 is further configured to send the data packet to a controller if the entry that matches the data packet does not exist in the first match table such that the controller generates a forwarding entry generation instruction.

The network device 10 further includes an instruction receiving module 1007 configured to receive the forwarding entry generation instruction sent by the controller, and generate a forwarding entry in the first match table according to the forwarding entry generation instruction.

The layer 2 service processing module 1003 may be further configured to save the layer 2 forwarding entry in a physical address table of the first match table.

Optionally, the network device 10 may further include an index number obtaining module 1008 configured to obtain an index number of the layer 2 forwarding entry in the first match table, a report message generation module 1009 configured to generate a report message, a report message sending module 1010 configured to send the report message to a controller, where the report message includes the index number and the data packet such that the controller generates a forwarding entry generation instruction according to the data packet, and the forwarding entry generation instruction includes the index number. The instruction receiving module 1007 is further configured to receive the forwarding entry generation instruction sent by the controller, and search the first match table for the layer 2 forwarding entry according to the index number in the forwarding entry generation instruction, and an entry determining module 1011 configured to determine whether the layer 2 forwarding entry is the same as a forwarding entry generated under an indication of the forwarding entry generation instruction.

The layer 2 service processing module 1003 is further configured to modify the layer 2 forwarding entry according to the forwarding entry generation instruction if the layer 2 forwarding entry is different from the forwarding entry generated under the indication of the forwarding entry generation instruction.

The report message sending module 1010 is further configured to send the report message and the layer 2 forwarding entry to a controller, and the report message includes the index number and the data packet such that the controller generates a forwarding entry generation instruction according to the data packet.

The instruction receiving module 1007 is further configured to receive the forwarding entry generation instruction sent by the controller when the controller determines that a forwarding entry generated under an indication of the forwarding entry generation instruction is different from the layer 2 forwarding entry, and the forwarding entry generation instruction includes the index number.

The layer 2 service processing module 1003 is further configured to search the first match table for the layer 2 forwarding entry according to the index number in the forwarding entry generation instruction, and modify the layer 2 forwarding entry in the first match table according to the forwarding entry generation instruction.

It may be understood that functions of function modules of the network device 10 in this embodiment may be implemented according to the methods in the foregoing method embodiments. For details, reference may be made to related description of the method embodiment in FIG. 2 to FIG. 8, and details are not described herein.

Figure 11:
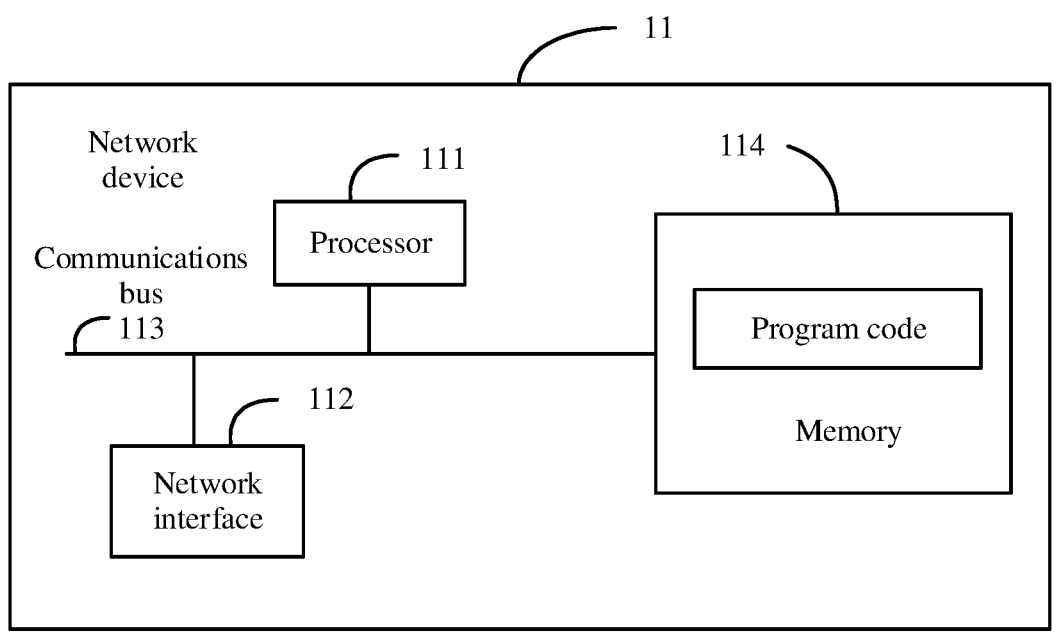
FIG. 11 is a schematic structural diagram of another network device according to a tenth embodiment of the present disclosure.

FIG. 11 is a schematic structural diagram of another network device 11 according to a tenth embodiment of the present disclosure. As shown in FIG. 11, a self-learning function of a hardware layer of the network device 11 is disabled and is used to maintain a first match table, and a self-learning function of a software layer of the network device 11 is enabled and is used to maintain a second match table. The network device 11 may include at least one processor 111 such as a central processing unit (CPU), at least one network interface 112, at least one communications bus 113, and a memory 114. The communications bus 113 is configured to implement connection and communication between these components. The memory 114 may be a high-speed random access memory (RAM), or may be a non-volatile memory, such as at least one magnetic disk memory. Optionally, the memory 114 may further be at least one storage apparatus that is away from the foregoing processor 111. The memory 114 stores a program code, and the processor 111 is configured to invoke the program code stored in the memory 114 to perform the operations of receiving a data packet using the network interface, checking whether an entry that matches the data packet exists in the first match table, obtaining a local physical address and a destination physical address of the data packet if the entry that matches the data packet does not exist in the first match table, determining whether the local physical address is the same as the destination physical address of the data packet, searching the second match table for an entry in which a physical address matches the destination physical address if the local physical address is different from the destination physical address, generating a layer 2 forwarding entry according to the entry that matches the destination physical address, and forwarding the data packet according to the layer 2 forwarding entry, if the local physical address is the same as the destination physical address, the processor 111 may be further configured to perform the operations of obtaining a destination IP address of the data packet, searching the second match table for an entry that matches the destination IP address, generating a layer 3 forwarding entry according to the entry that matches the destination IP address, and forwarding the data packet according to the layer 3 forwarding entry.

A match field of the layer 2 forwarding entry includes the destination physical address and a VLAN identifier of the data packet, and an instruction set of the layer 2 forwarding entry includes an output port number.

A match field of the layer 3 forwarding entry includes at least one of the following match entries an input port number, the destination physical address, the destination IP address, or a source IP address of the data packet, and an instruction set of the layer 3 forwarding entry includes an output port number, a TTL reduction instruction, and a physical address modification instruction.

If the entry that matches the data packet does not exist in the first match table, the processor 111 may be further configured to perform the operations of sending the data packet to a controller such that the controller generates a forwarding entry generation instruction, receiving the forwarding entry generation instruction sent by the controller, generating a forwarding entry in the first match table according to the forwarding entry generation instruction.

After generating, by invoking the program code stored in the memory 114, the layer 2 forwarding entry according to the entry that matches the destination physical address, the processor 111 may further perform the operation of saving the layer 2 forwarding entry in a physical address table of the first match table.

In an optional implementation manner, after saving the layer 2 forwarding entry in the physical address table of the first match table by invoking the program code stored in the memory 114, the processor 111 may further perform the operations of obtaining an index number of the layer 2 forwarding entry in the first match table, generating a report message, sending the report message to a controller, where the report message includes the index number and the data packet such that the controller generates a forwarding entry generation instruction according to the data packet, and the forwarding entry generation instruction includes the index number, receiving the forwarding entry generation instruction sent by the controller, searching the first match table for the layer 2 forwarding entry according to the index number in the forwarding entry generation instruction, determining whether the layer 2 forwarding entry is the same as a forwarding entry generated under an indication of the forwarding entry generation instruction, and modifying the layer 2 forwarding entry in the first match table according to the forwarding entry generation instruction if the layer 2 forwarding entry is different from the forwarding entry generated under the indication of the forwarding entry generation instruction.

In another optional implementation manner, after saving the layer 2 forwarding entry in the physical address table of the first match table by invoking the program code stored in the memory 114, the processor 111 may further perform the operations of obtaining an index number of the layer 2 forwarding entry in the first match table, generating a report message, and sending the report message and the layer 2 forwarding entry to a controller, where the report message includes the index number and the data packet such that the controller generates a forwarding entry generation instruction according to the data packet, receiving the forwarding entry generation instruction sent by the controller when the controller determines that a forwarding entry generated under an indication of the forwarding entry generation instruction is different from the layer 2 forwarding entry, where the forwarding entry generation instruction includes the index number, searching the first match table for the layer 2 forwarding entry according to the index number in the forwarding entry generation instruction, and modifying the layer 2 forwarding entry in the first match table according to the forwarding entry generation instruction.

Optionally, the second match table includes a physical address table, and if the entry in which a physical address is the same as the destination physical address does not exist in the second match table, the processor 111 may further perform the operation of recording a source physical address, a VLAN identifier, and an input port number of the data packet in the physical address table of the second match table.

Optionally, the first match table includes at least one of a routing table or an ARP mapping table, and if the entry that matches the destination IP address does not exist in the second match table, the processor 111 may further perform the operations of creating a new entry in the second match table according to header information of the data packet, marking the created entry as "learning," routing the received data packet using a routing protocol, updating the created entry according to a routing result, and marking a status of the created entry as "learned."

The processor 111 may further invoke the code stored in the memory to perform the operation of receiving at least one entry delivered by the controller, and saving the at least one entry in the second match table.

It may be understood that functions of function modules of the network device 11 in this embodiment may be implemented according to the methods in the foregoing method embodiments. For details, reference may be made to related description of the method embodiment in FIG. 2 or FIG. 8, and details are not described herein.

An embodiment of the present disclosure further provides a computer storage medium. The computer storage medium stores a program, and when the program is executed, some or all of steps of methods described with reference to FIG. 2 to FIG. 9 in the embodiments of the present disclosure are included.

A person of ordinary skill in the art may understand that all or some of the processes of the methods in the embodiments may be implemented by a computer program instructing relevant hardware. The program may be stored in a computer readable storage medium. The processes of the methods in the embodiments are performed when the program runs. The foregoing storage medium may include a magnetic disk, an optical disc, a read-only memory (ROM), or a RAM.

What is disclosed above is merely examples of embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A data packet forwarding method applied to a network device, wherein the network device is a switch or a router, wherein a self-learning function of a hardware layer of the network device is disabled and maintains a first match table, wherein a self-learning function of a software layer of the network device is enabled and maintains a second match table, and wherein the method comprises:
receiving, by the network device, a data packet;
determining, by the network device, whether the first match table includes an entry matching the data packet;
obtaining, by the network device, a local physical address and a destination physical address of the data packet when the first match table does not include the entry matching the data packet;
comparing, by the network device, the local physical address to the destination physical address; and
when the comparison indicates that the local physical address is different than the destination physical address:
searching, by the network device, the second match table for an entry in which a physical address matches the destination physical address; and
generating, by the network device, a layer 2 forwarding entry according to the entry matching the destination physical address; and
forwarding, by the network device, the data packet according to the layer 2 forwarding entry.

2. The method of claim 1, further comprising:
obtaining a destination Internet Protocol (IP) address of the data packet when the local physical address is the same as the destination physical address;
searching the second match table for an entry matching the destination IP address;
generating a layer 3 forwarding entry according to the entry matching the destination IP address; and
forwarding the data packet according to the layer 3 forwarding entry.

3. The method of claim 2, wherein a match field of the layer 2 forwarding entry comprises the destination physical address and a virtual local area network (VLAN) identifier of the data packet, wherein an instruction set of the layer 2 forwarding entry comprises an output port number, wherein a match field of the layer 3 forwarding entry comprises at least one of the following match entries:
an input port number;
the destination physical address;
the destination IP address; or
a source IP address of the data packet, and
wherein an instruction set of the layer 3 forwarding entry comprises the output port number, a time-to-live (TTL) reduction instruction, and a physical address modification instruction.

4. The method of claim 1, further comprising:
sending the data packet to a controller when the entry matching the data packet does not exist in the first match table;
receiving a forwarding entry generation instruction from the controller; and
generating a forwarding entry in the first match table according to the forwarding entry generation instruction.

5. The method of claim 1, wherein the first match table comprises a physical address table, and wherein after generating the layer 2 forwarding entry, the method further comprises saving the layer 2 forwarding entry generated by the network device in the physical address table of the first match table.

6. The method of claim 5, wherein after saving the layer 2 forwarding entry, the method further comprises:
obtaining an index number of the layer 2 forwarding entry in the first match table;
generating a report message;
sending the report message to a controller, wherein the report message comprises the index number and the data packet;
receiving a forwarding entry generation instruction comprising the index number from the controller;

searching the first match table for the layer 2 forwarding entry according to the index number in the forwarding entry generation instruction; determining the layer 2 forwarding entry is different than a forwarding entry generated based on the forwarding entry generation instruction; and modifying the layer 2 forwarding entry in the first match table according to the forwarding entry generation instruction.

7. The method of claim 5, wherein after saving the layer 2 forwarding entry, the method further comprises:
obtaining an index number of the layer 2 forwarding entry in the first match table;
generating a report message;
sending the report message and the layer 2 forwarding entry to a controller, wherein the report message comprises the index number and the data packet;
receiving a forwarding entry generation instruction from the controller when a forwarding entry generated under an indication of the forwarding entry generation instruction is different from the layer 2 forwarding entry, wherein the forwarding entry generation instruction comprises the index number;
searching the first match table for the layer 2 forwarding entry according to the index number in the forwarding entry generation instruction; and
modifying the layer 2 forwarding entry in the first match table according to the forwarding entry generation instruction.

8. The method of claim 1, wherein the second match table comprises a physical address table, and wherein the method further comprises recording a source physical address of the data packet, a virtual local area network (VLAN) identifier, and an input port number in the physical address table of the second match table when the entry in which the physical address is the same as the destination physical address does not exist in the second match table.

9. The method of claim 2, wherein the first match table comprises at least one of a routing table or an address resolution protocol (ARP) mapping table, and wherein the method further comprises:
creating a new entry in the second match table according to header information of the data packet when the entry matching the destination IP address does not exist in the second match table;
marking the created new entry as learning;
routing the data packet using a routing protocol;
updating the created new entry according to a routing result; and
marking a status of the created new entry as learned.

10. The method of claim 1, further comprising:
receiving at least one entry from a controller; and
saving the at least one entry in the second match table.

11. A network device, wherein a self-learning function of a hardware layer of the network device is disabled and maintains a first match table, wherein a self-learning function of a software layer of the network device is enabled and maintains a second match table, wherein the network device is a switch or a router, and wherein the network device comprises:
a network interface;
a memory coupled to the network interface and configured to store programs; and
a processor coupled to the network interface and the memory, wherein the programs, when executed by the processor, cause the processor to be configured to:
receive a data packet;
determine whether the first match table includes an entry matching the data packet;
obtain a local physical address and a destination physical address of the data packet when the first match table does not include the entry matching the data packet;
compare the local physical address to the destination physical address;
when the comparison indicates that the local physical address is different than the destination physical address:
search the second match table for an entry in which a physical address matches the destination physical address when the local physical address is different from the destination physical address;
generate a layer 2 forwarding entry according to the entry matching the destination physical address; and
forward the data packet according to the layer 2 forwarding entry.

12. The network device of claim 11, wherein the programs further cause the processor to be configured to:
obtain a destination Internet Protocol (IP) address of the data packet when the local physical address is the same as the destination physical address;
search the second match table for an entry matching the destination IP address;
generate a layer 3 forwarding entry according to the entry matching the destination IP address; and
forward the data packet according to the layer 3 forwarding entry.

13. The network device of claim 12, wherein a match field of the layer 2 forwarding entry comprises the destination physical address and a virtual local area network (VLAN) identifier of the data packet, wherein an instruction set of the layer 2 forwarding entry comprises an output port number, wherein a match field of the layer 3 forwarding entry comprises at least one of the following match entries:
an input port number;
the destination physical address;
the destination IP address; or
a source IP address of the data packet, and
wherein an instruction set of the layer 3 forwarding entry comprises the output port number, a time-to-live (TTL) reduction instruction, and a physical address modification instruction.

14. The network device of claim 11, wherein the programs further cause the processor to be configured to:
send the data packet to a controller when the entry matching the data packet does not exist in the first match table;
receive a forwarding entry generation instruction from the controller; and
generate a forwarding entry in the first match table according to the forwarding entry generation instruction.

15. The network device of claim 11, wherein the first match table comprises a physical address table, and wherein after generating the layer 2 forwarding entry, the programs further cause the processor to be configured to save the layer 2 forwarding entry generated by the network device in the physical address table of the first match table.

16. The network device of claim 15, wherein after saving the layer 2 forwarding entry, the programs further cause the processor to be configured to:
obtain an index number of the layer 2 forwarding entry in the first match table;

generate a report message;

send the report message to a controller, wherein the report message comprises the index number and the data packet;

receive a forwarding entry generation instruction comprising the index number from the controller;

search the first match table for the layer 2 forwarding entry according to the index number in the forwarding entry generation instruction;

determine the layer 2 forwarding entry is different than a forwarding entry generated under an indication of the forwarding entry generation instruction; and modify the layer 2 forwarding entry in the first match table according to the forwarding entry generation instruction.

17. The network device of claim 15, wherein after saving the layer 2 forwarding entry, the programs further cause the processor to be configured to:

obtain an index number of the layer 2 forwarding entry in the first match table;

generate a report message;

send the report message and the layer 2 forwarding entry to a controller, wherein the report message comprises the index number and the data packet;

receive a forwarding entry generation instruction from the controller when a forwarding entry generated under an indication of the forwarding entry generation instruction is different from the layer 2 forwarding entry, wherein the forwarding entry generation instruction comprises the index number;

search the first match table for the layer 2 forwarding entry according to the index number in the forwarding entry generation instruction; and modify the layer 2 forwarding entry in the first match table according to the forwarding entry generation instruction.

18. The network device of claim 11, wherein the second match table comprises a physical address table, and wherein the programs further cause the processor to be configured to record a source physical address of the data packet, a virtual local area network (VLAN) identifier, and an input port number in the physical address table of the second match table when the entry in which the physical address is the same as the destination physical address does not exist in the second match table.

19. The network device claim 12, wherein the first match table comprises at least one of a routing table or an address resolution protocol (ARP) mapping table, and wherein the programs further cause the processor to be configured to:

create a new entry in the second match table according to header information of the data packet when the entry matching the destination IP address does not exist in the second match table;

mark the created new entry as learning;

route the received data packet using a routing protocol;

update the created new entry according to a routing result; and mark a status of the created new entry as learned.

20. The network device of claim 11, wherein the programs further cause the processor to be configured to:

receive at least one entry from a controller, and save the at least one entry in the second match table.

* * * * *